Jan. 28, 1969     E. BLACK     3,424,263
SAFETY STEERING COLUMN
Filed Sept. 28, 1966
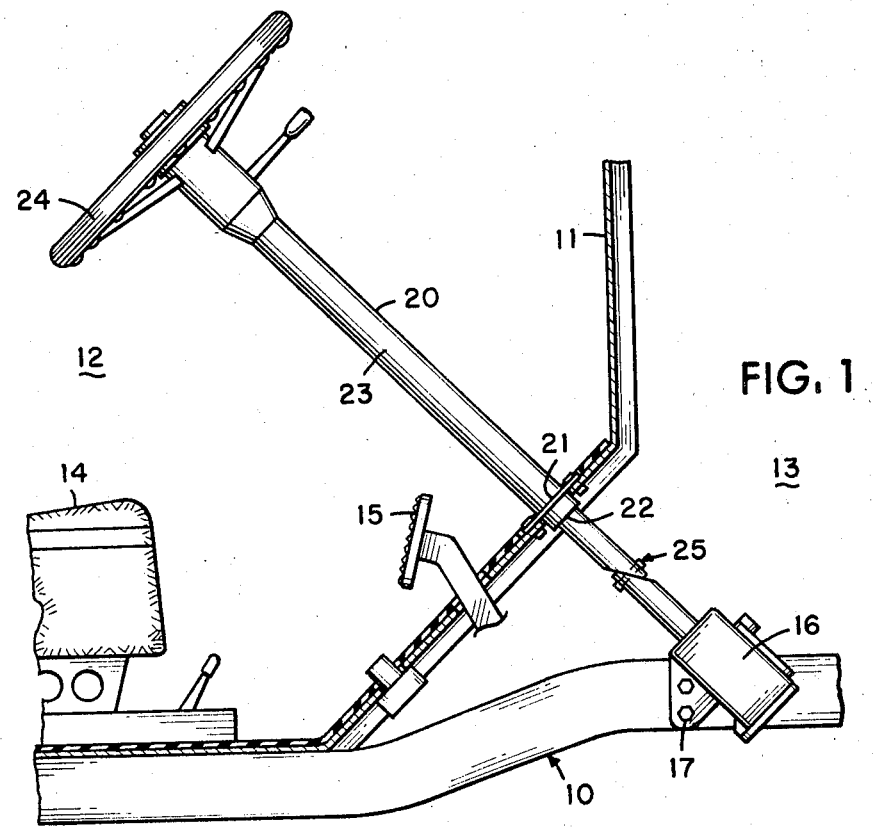
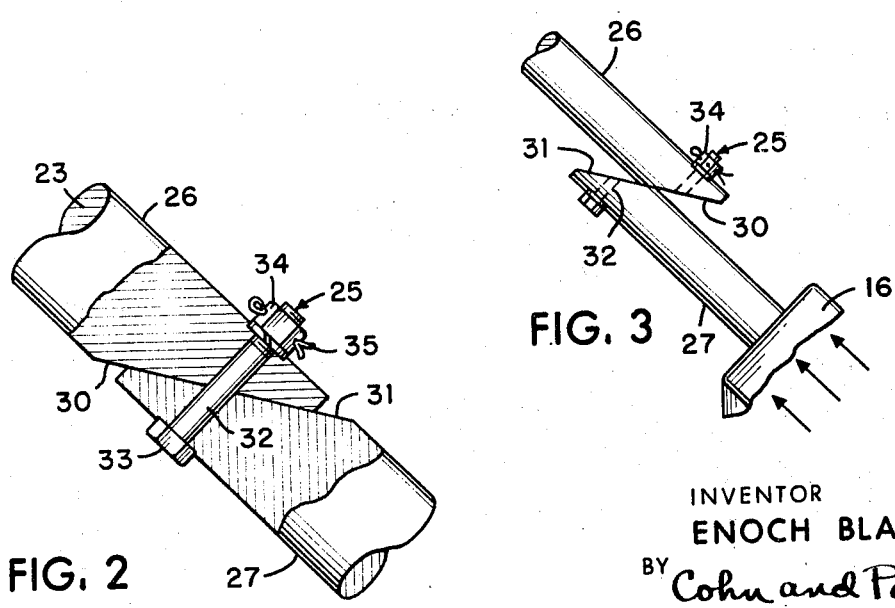
INVENTOR
ENOCH BLACK
BY *Cohn and Powell*
ATTORNEYS

United States Patent Office 3,424,263
Patented Jan. 28, 1969

3,424,263
SAFETY STEERING COLUMN
Enoch Black, Rte. 2, Granby, Mo. 64844
Filed Sept. 28, 1966, Ser. No. 582,645
U.S. Cl. 180—82                                  4 Claims
Int. Cl. B60r 21/02; B62d 1/18, 1/20

ABSTRACT OF THE DISCLOSURE

The safety steering assembly includes a steering shaft interconnecting a gear box and steering wheel. The shaft is rotatively mounted within a tubular column which is mounted on a vehicle firewall, and the shaft includes separable parts having a breakable joint connection located outside of the tubular column. The joint includes inclined contiguous parts held together under normal operating conditions and completely separable on collision impact.

---

This invention relates generally to improvements in a safety steering assembly.

In a front end collision, the steering gear box mounted to the frame ahead of the firewall is one of the first parts to incur impact. The steering gear box, in the heretofore conventional steering assembly, is usually pushed rearwardly upon impact in this type of collision, and consequently can push the steering column and firewall into the driver's compartment, and possibly against the driver. This hazardous condition can result in very serious injury and even death, to the driver.

It is a major objective of the present invention to provide a steering assembly in which the steering shaft is disconnected automatically upon impact of sufficient force to the steering gear box, so that the front end of the shaft hangs in the wreck and so that such shaft cannot push the steering column and firewall rearwardly. Any possibility of injury to the driver or to any front seat passenger from this specific cause is eliminated.

An important objective is achieved by the provision of a breakable connection between separable portions of the steering shaft that operatively interconnects the steering gear box and extends through the tubular column. The breakable connection is adapted to separate the steering shaft upon collision ahead of the firewall to preclude movement of the firewall, steering column and shaft as a unit into the driver's compartment by any force exerted on the shaft by the steering gear box.

Another important object is afforded by locating the breakable connection between the steering gear box and the tubular column. Specifically, the breakable connection is located on a length of shaft outside of the tubular column and ahead of the firewall so that upon separation of the shaft portions, the front end of the shaft portion will hang loosely in the wreck ahead of the firewall. Because the breakable connection is located outside of the tubular column, it is readily available for inspection and service.

Still another important object is attained in that the breakable connection includes a shear pin extending between and interconnecting the separable portions of the shaft, the pin shearing under a predetermined load exerted longitudinally along the shaft by the steering gear box upon collision so as to separate the shaft portions.

An important object is provided by the structural arrangement in which the firewall, steering column and shaft can break loose and move rearwardly to the driver's compartment under a predetermined load exerted longitudinally along the shaft by the steering gear box upon collision, but the breakable connection fails under a longitudinal shaft load less than the said predetermined load so as to separate the shaft portions and thereby preclude such rearward movement.

Another important object is achieved by the provision of a joint between the separable shaft portions defined by contiguous surfaces inclined at an acute angle to the longitudinal axis of the shaft. The shear pin of the breakable connection extends transversely between the inclined contiguous surfaces and interconnects the shaft portions at the joint. The pin shears under a predetermined load exerted longitudinally along the shaft by the steering gear box upon collision so as to separate the shaft portions at the joint by relative sliding movement of the inclined surfaces.

Yet another important object is to provide a safety steering assembly that is simple and durable in construction, economical to manufacture and assemble, highly efficient in operation, and which operates automatically upon collision to protect the driver or any front seat passenger.

The foregoing and numerous other objects and advantages of the invention will more clearly appear from the following detailed description of a preferred embodiment, particularly when considered in connection with the accompanying drawing, in which:

FIG. 1 is a side elevational view of the safety steering assembly, with parts of the vehicle illustrated in cross-section;

FIG. 2 is an enlarged, fragmentary view, partly in cross-section of the joint and breakable connection between separable portions of the steering shaft, and FIG. 3 is a fragmentary side elevational view illustrating the shaft portions operatively disconnected under a predetermined load applied longitudinally to the steering shaft.

Referring now by characters of reference to the drawing, and first to FIG. 1, it will be understood that the vehicle includes a frame generally indicated at 10 on which is mounted a firewall 11 that partially defines the front of a driver's compartment 12. The firewall 11 is a partition between the engine compartment 13 located ahead of the firewall and the driver's compartment 12 located behind the firewall. As is usual, a driver's seat 14 is located in the driver's compartment 12, and operating pedals and linkage 15 extend forwardly through the firewall 11.

The safety steering mechanism includes a conventional type of steering gear box 16 mounted by bolts 17 to a portion of the frame 10 ahead of the firewall 11. A tubular column 20 is mounted to the firewall 11 by a bracket 21, and is usually mounted by a bracket or other fastener (not shown) to the dashboard (not shown) located at the front of the driver's compartment 12. The elongate tubular column 20 extends upwardly and rearwardly from the firewall 11 into the driver's compartment 12. The front end 22 of tubular column 20 is open and can extend slightly ahead of firewall 11.

Operatively interconnected to the steering gear box 16 is a steering shaft 23, the shaft 23 extending into tubular column 20 through the front shaft end 22. The steering shaft 23 is rotatively mounted to and within the tubular column 20. A steering wheel 24 is operatively connected to the shaft 23 for rotating the shaft 23 incident to steering the vehicle.

A breakable connection referred to by 25 in FIG. 1 is provided between separable portions of the steering shaft 23. This breakable connection 25 is adapted to separate the steering shaft 23 upon collision ahead of the firewall 11 to preclude movement of the firewall 11, steering column 20 and shaft 23 into the driver's compartment 12 by any force exerted on the shaft 23 by the steering gear box 16. From FIG. 1, it is seen that the breakable connection 25 is located between the steering gear box 16 and the front end 22 of tubular column 20. In the preferred embodiment, the breakable connection 25 is located along a length of shaft 23 outside of the tubular column 20 and ahead of the firewall 11. The detail construction of the breakable connection 25 is best illustrated in FIG. 2, and the functional result is best illustrated in FIG. 3.

The separable portions 26 and 27 (FIG. 2) of steering shaft 23, have a joint formed by contiguous surfaces 30 and 31 inclined at an acute angle to the longitudinal axis of shaft 23. In the preferred embodiment this acute angle approximates thirty (30) degrees.

The breakable connection 25 operatively interconnecting the separable shaft portions 26 and 27 at this joint includes a shear pin 32 extending transversely between the inclined contiguous surfaces 30 and 31. One end of the shear pin 32 is provided with a head 33 abutting one side of the shaft portion 27. A nut threadedly attached to the opposite end of the shear pin 32 abuts the opposite side of the other shaft portion 26. The shear pin 32 and the nut 34 clamp the shaft portions 26 and 27 securely together with inclined surfaces 30 and 31 in contiguous relationship. A cotter pin 35 extends through the nut 34 and the shear pin 32 so as to fix the nut 34 in place and prevent unintentional disconnection.

The shear pin 32 will shear at a cross-section between the inclined contiguous surfaces 30 and 31 under a predetermined load exerted longitudinally along the shaft 23 by the steering gear box 16 upon collision. As shown in FIG. 3, the shaft portions 26 and 27 will separate at the joint by relative sliding movement of the inclined surfaces 30 and 31.

It is thought that the functional advantages of the safety steering assembly have become fully apparent from the foregoing detailed description of parts, but for completeness of disclosure, the usage will be briefly described. Under normal operation the separable shaft portions 26 and 27 are secured together by the breakable connection 25. The steering wheel 24 can be manipulated by the driver to turn the steering shaft 23 and thereby turn the wheels of the vehicle through the conventional interconnecting mechanism including the steering gear box 16.

Upon collision with the front end of the vehicle, the steering gear box 16 is usually one of the first parts to be subjected to impact in view of the fact that it is mounted on the front portion of the frame 10 ahead of the firewall 11, and is usually disposed near the front of the vehicle.

When the steering shaft 23 is subjected to a predetermined load along its longitudinal axis by the rearward movement of the steering gear box 16, upon such impact, the shear pin 32 will shear and the inclined surfaces 30 and 31 will slide relatively to separate the shaft portions 26 and 27. Of course, the shear pin 32 will shear under a predetermined load before any force applied to the shaft 23 by the steering gear box 16 can move the firewall 11, steering column 20 and steering wheel 24 rearwardly. On the contrary, the firewall 11, the steering column and the steering wheel 24 will remain stationary. The separated shaft portion 26 will hang freely ahead of the firewall 11.

Most firewall and instrument panels will stand about three or four hundred (300 or 400) pounds of force applied longitudinally along the steering shaft 23 before they will bend. Therefore, the shear pin 32 can be designed to shear at about one hundred or one hundred fifty (100 or 150) pounds of force so that the steering column 20 will remain stationary. As a result, it will be understood that the steering column 20, the steering wheel 24 and the firewall 11 will not be moved rearwardly into the driver's compartment 12 as a result of any load applied to the steering gear box 16.

Although the invention has been described by making detailed reference to a single preferred embodiment, such detail is to be understood in an instructive, rather than in any restrictive sense, many variants being possible within the scope of the clams hereunto appended.

I claim as my invention:

1. A safety steering assembly in a vehicle having a frame, and having a firewall carried by the frame and partially defining the front of a driver's compartment, comprising:
   (a) a steering gear box mounted on and carried by the frame ahead of the firewall,
   (b) a tubular column mounted to the firewall and extending rearwardly into the driver's compartment,
   (c) a steering shaft operatively connected to the steering gear box and extending through the tubular column, the shaft being rotatively mounted to the tubular column,
   (d) a steering wheel operatively connected to the shaft for rotating the shaft,
   (e) a breakable connection between separable portions of the steering shaft adapted to separate the steering shaft upon collision to preclude movement of the firewall, steering column and shaft into the driver's compartment by any force exerted on the shaft by the steering gear box, the separable portions including a joint provided by contiguous surfaces inclined at an acute angle to the longitudinal axis of the shaft, and
   (f) the breakable connection including means securing the joint and maintaining the surfaces in contiguous relation under normal operating conditions yet allowing complete separation of the separable shaft portions upon impact.

2. A safety steering assembly as defined in claim 1, in which:
   (g) the breakable connection is located along a length of shaft outside of the tubular column and ahead of the firewall, the joint connecting the separable shaft portions only.

3. A safety steering assembly in a vehicle having a frame, and having a firewall carried by the frame and partially defining the front of a driver's compartment, comprising:
   (a) a steering gear box mounted on and carried by the frame ahead of the firewall,
   (b) a tubular column mounted to the firewall and extending rearwardly into the driver's compartment,
   (c) a steering shaft operatively connected to the steering gear box and extending through the tubular column, the shaft being rotatively mounted to the tubular column,
   (d) a steering wheel operatively connected to the shaft for rotating the shaft,
   (e) a breakable connection between separable portions of the steering shaft adapted to separate the steering shaft upon collision to preclude movement of the firewall, steering column and shaft into the driver's compartment by any force exerted on the shaft by the steering gear box,
   (f) the separable shaft portions having a joint provided by contiguous surfaces inclined at an acute angle to a longitudinal axis of the shaft,
   (g) the breakable connection including a shear pin extending transversely between the inclined contiguous surfaces and interconnecting the shaft portions at the joint, and
   (h) the pin shearing under a predetermined load exerted longitudinally along the shaft by the steering gear box upon collision so as to separate the shaft portions at the joint by relative sliding movement of the inclined surfaces.

4. A safety steering assembly as defined in claim 3, in which:
   (i) the joint and breakable connection are located outwardly of the tubular column and ahead of the firewall and are located between the steering gear box and the tubular column, and (j) the shaft separates before the shaft can push the firewall and column rearwardly into the driver's compartment.

References Cited

UNITED STATES PATENTS

| | | | |
|---|---|---|---|
| 2,548,244 | 4/1951 | Stein | 74—492 |
| 2,845,144 | 7/1958 | Bohn | 293—52 |
| 3,329,040 | 7/1967 | Stein | 74—492 |
| 3,112,955 | 12/1963 | Stolz | 293—52 |

BENJAMIN HERSH, *Primary Examiner.*

ROBERT R. SONG, *Assistant Examiner.*

U.S. Cl. X.R.

74—492; 280—87